United States Patent
Guguen et al.

(10) Patent No.: US 9,419,813 B2
(45) Date of Patent: Aug. 16, 2016

(54) METHOD AND DEVICE FOR TRANSMITTING DATA TO SEVERAL RECEIVERS USING ARQ

(75) Inventors: Charline Guguen, Rennes (FR); Patrick Fontaine, Rennes (FR); Renaud Dore, Rennes (FR); Ludovic Jeanne, Rennes (FR)

(73) Assignee: THOMSON LICENSING, Boulogne-Billancourt (FR)

( * ) Notice: Subject to any disclaimer, the term of this patent is extended or adjusted under 35 U.S.C. 154(b) by 702 days.

(21) Appl. No.: 12/226,459

(22) PCT Filed: Mar. 26, 2007

(86) PCT No.: PCT/EP2007/052871
§ 371 (c)(1),
(2), (4) Date: Oct. 17, 2008

(87) PCT Pub. No.: WO2007/118767
PCT Pub. Date: Oct. 25, 2007

(65) Prior Publication Data
US 2009/0077259 A1    Mar. 19, 2009

(30) Foreign Application Priority Data
Apr. 18, 2006   (EP) ..................................... 06290645

(51) Int. Cl.
*G06F 15/16* (2006.01)
*H04L 12/18* (2006.01)
(Continued)

(52) U.S. Cl.
CPC .......... *H04L 12/1868* (2013.01); *H04L 1/1867* (2013.01); *H04L 1/1883* (2013.01); *H04L 1/1664* (2013.01); *H04L 1/1877* (2013.01); *H04L 2001/0093* (2013.01)

(58) Field of Classification Search
CPC ..................................................... H04L 1/1867
USPC ......................................................... 709/237
See application file for complete search history.

(56) References Cited

U.S. PATENT DOCUMENTS

| 6,163,810 A | 12/2000 | Bhagavath et al. |
| 6,774,182 B2 | 8/2004 | Yoo et al. |

(Continued)

FOREIGN PATENT DOCUMENTS

| CN | 1567890 | 1/2005 |
| EP | 0844760 | 5/1998 |

(Continued)

OTHER PUBLICATIONS

IEEE. IEEE Std 802.16e: IEEE Standard for Local and metropolitan area networks. Feb. 2006. IEEE Computer Society and the IEEE Microwave Theory and Techniques Society. pp. 1-2, 7-10, and 659.*

(Continued)

*Primary Examiner* — Bryan Lee
(74) *Attorney, Agent, or Firm* — Tutunjian & Bitetto, P.C.

(57) ABSTRACT

The present invention concerns a method and a device for transmitting data between a sender, and at least two receivers, in a network where a data between a sender and a receiver is carried on a connection and where a unicast connection enables a sender to send the data and a receiver to acknowledge a reception of the data. The method comprises the steps of opening a unique unicast connection identified with a connection identifier; and indicating the connection identifier to the sender and the receivers, so that the sender sends the data on the unicast connection, and the receivers receive the data on the unicast connection.

12 Claims, 7 Drawing Sheets

(51) Int. Cl.
*H04L 1/18* (2006.01)
*H04L 1/16* (2006.01)
*H04L 1/00* (2006.01)

(56) References Cited

U.S. PATENT DOCUMENTS

| | | | |
|---|---|---|---|
| 8,774,182 | B2* | 7/2014 | Zhang et al. ............ 370/392 |
| 2002/0075824 | A1 | 6/2002 | Willekes et al. |
| 2003/0079169 | A1 | 4/2003 | Ho et al. |
| 2005/0135403 | A1 | 6/2005 | Ketchum et al. |
| 2005/0255862 | A1 | 11/2005 | Jung et al. |
| 2008/0089268 | A1* | 4/2008 | Kinder et al. ............ 370/315 |
| 2009/0147718 | A1* | 6/2009 | Liu et al. ................. 370/312 |

FOREIGN PATENT DOCUMENTS

| | | |
|---|---|---|
| EP | 1460791 | 9/2004 |
| EP | 1482671 | 12/2004 |
| JP | 2001103051 | 4/2001 |
| JP | 2002-185528 | 6/2002 |
| JP | 2002171257 | 6/2002 |
| JP | 2003124875 | 4/2003 |
| JP | 2007509531 | 4/2007 |
| JP | 2007536791 | 12/2007 |
| JP | 200872466 | 3/2008 |
| WO | WO9622641 | 7/1996 |
| WO | WO0177841 | 10/2001 |
| WO | WO0213440 | 2/2002 |
| WO | WO0223791 | 3/2002 |
| WO | WO2005039128 | 4/2005 |

OTHER PUBLICATIONS

Levine et al. A Comparison of Known Classes of Reliable Multicast Protocols. IEEE. 1996. pp. 112-121.*
Peng GE et al; Institute of Electrical and Electronics Engineers: "Comparisons of error control techniques for wireless video multicasting", Conf. Proceedings of the 2002 IEEE Int'l Performance, Computing and Communications Conf., Apr. 3-5, 2002, vol. CONF. 21, Apr. 3, 2002, pp. 93-102, XP010588360.
Wei Lou et al: "A reliable broadcast algorithm with selected acknowledgements in mobile ad hoc networks", IEEE Global Telecommunications Conference. Dec. 1-5, 2003 IEEE, vol. 7 of 7, Dec. 1, 2003, pp. 3536-3541, XP010677209.
Min Jeong Lee et al: "Performance improvements of wireless IP multicast conference system based on designated receivers", Communications 1998, IEEE Jun. 7-11, 1998, vol. 2, Jun. 7, 1998, pp. 807-811, XP010284688.
Kuri et al., "Reliable Multicast in Multi-access Wireless LANs", IEEE Eighteenth Annual Joint Conference on Computer Communications, New York, New York, USA, Mar. 21, 1999, pp. 760-767.
Kuri et al., "Reliable Multicast in Multi—access Wireless LANs", India Wireless Networks, vol. 7, No. 4, 2001, pp. 359-369.
Li et al., "A Practical Proactive Hybrid FEC ARQ Technique for reliable multi-session multicast communication", 10th IEEE International Conference on Electronics, Circuits, and Systems, Dec. 14, 2003, pp. 519-522.
Peng et al., "Comparisons of error control techniques for wireless video multicasting", Conference Proceedings of the 2002 IEEE International Performance, Computing, and Communications Conference (IPCCC), Phoenix, Arizona, USA, Apr. 3, 2002, pp. 93-102.
Wei et al: "A reliable broadcast algorithm with selected acknowledgements in mobile ad hoc networks", 2003 IEEE Global Telecommunications Conference. Conference, San Francisco, California, USA, Dec. 1, 2003, pp. 3536-3541.
Lee et al., "Performance improvements of wireless IP multicast conference system based on designated receivers", 1998 IEEE International Conference on Communications, Atlanta, Georgia, USA, Jun. 7, 1998, pp. 807-811.
Block et al., "On the design of a new scalable reliable multicast transport protocol", Interoperable Communications Networks, vol. 1, No. 2-4, 1998, pp. 380-388.
Block et al., "Some Design Issues of SRMTP, a Scalable Reliable Multicast Transport Protocol", 4th European Conference on Multilmedia Applications, Services and Techniques, Madrid, Spain, May 26, 1999, pp. 423-440.
Zeng et al., "Analysis of FEC-NAK approach for scalable reliable multicast", Proceedings of the 36th Annual Allerton Conference on Communication, Control, and Computing, University of Illinois, Illinois, USA, Sep. 23, 1998, pp. 69-78.
Kim et al., "Throughput and resequencing delay analysis of a selective-repeat ARQ protocol for K-reliable multicast", TC Specialists Seminar on Control in Communications, Sep. 17, 1996, pp. 115-127.
Jolfaei et al., "A New Selective Repeat ARQ Scheme for Multicast Communication", Broadband Communications, vol. C-24, Mar. 2, 2004, pp. 119-136.
IEEE Standard 802.16, "Standard for Local and metropolitan area networks—Part 16: Air Interface for Fixed Broadband Wireless Access Systems", IEEE, New York, Oct. 1, 2004, pp. 1-893.
Chatte et al., "Congestion control in internet transport protocols",Technique et Science Informatiques, vol. 23, No. 8, 2004, pp. 1057-1084.

\* cited by examiner

METHOD AND DEVICE FOR TRANSMITTING DATA TO SEVERAL RECEIVERS USING ARQ

This application claims the benefit, under 35 U.S.C. §365 of International Application PCT/EP2007/052871, filed Mar. 26, 2007, which was published in accordance with PCT Article 21(2) on Oct. 25, 2007 in English and which claims the benefit of European patent application No. 06290645.8, filed on Apr. 18, 2006.

The present invention relates to a method and a device for transmitting data to several receivers with an automatic repetition request mechanism.

The wireless medium is by nature subject to disruptive factors that lead to a residual packet error rate. To enhance the wireless transmission quality, some wireless standards, such as IEEE802.11 and IEEE802.16, implement an automatic repetition request mechanism, noted ARQ. This error control mechanism allows the receiver of a communication to automatically request the retransmission of a packet from the transmitter. The ARQ mechanism is part of the medium access control sub-layer that is part of the data link layer.

The repetition mechanisms are not adapted to broadcast or multicast communications toward several receivers. The ARQ mechanisms are based on point to point connections, and a number of requests of retransmission may become very high in case of several receivers. The amount of data to retransmit may then become important and even one receiver having a bad reception may disturb all the other receivers by slowing the transmissions due to the repetition mechanism. The broadcast or multicast communications are then not appropriate in the wireless domain when the quality of the wireless medium is low.

The present invention concerns a method and a device for transmitting data to several receivers in a using an automatic repetition request mechanism.

To this end, the invention relates to a method for transmitting data between a sender, and at least two receivers, in a network where a data between a sender and a receiver is carried on a connection and where a unicast connection enables a sender to send the data and a receiver to acknowledge a reception of the data. The method comprises the steps of opening a unique unicast connection identified with a connection identifier; and indicating the connection identifier to the sender and the receivers, so that the sender sends the data on the unicast connection, and the receivers receive the data on the unicast connection.

Surprisingly the same unicast connection is used to transport a data from a sender to several receivers. The sender does not use a different unicast connection to each receiver for the same data.

According to an embodiment, the method comprises the steps of sending data by the sender on the unique unicast connection to the receivers, receiving acknowledgment by the sender; and identifying by the sender the emitter of the acknowledgment.

The sender has the capability to receive the acknowledgment packets from several receivers of a packet sent over a unicast connection. It also identifies the emitter of the acknowledgment packet. This enables the sender to know whether all the receivers have received the data or not.

According to an embodiment, the method comprises the step of reemitting the data by the sender either if the acknowledgment has not been received from all the receivers or at least an acknowledgment indicates that a receiver has not correctly received the data.

The mechanism for reemitting a packet by the sender takes into account the acknowledgment packets received from all the receivers, and not only from a receiver only.

According to another embodiment, the method comprises the steps of sending data over a unique unicast connection to receivers of a first group and receivers of a second group; and reemitting the data either if the acknowledgment has not been received from all receivers of the first group or at least an acknowledgment indicates that a receiver of the first group has not correctly received the data.

The mechanism for reemitting a packet by the sender takes into account a subset of the receivers only. This may be useful when the number of receivers is high and the amount of data to retransmit might then become significant. The sender limits the mechanism to a maximum number of receivers, or to some pre-identified privileged receivers.

Another object of the invention is a traffic controller device, in a network where a data between a sender and a receiver is carried on a connection, comprising means for opening a unique unicast connection, the unicast connection being identified with a connection identifier, the unicast connection enabling the receiver to acknowledge the reception of a data, and means for indicating the unique unicast connection identifier to the transmitter and at least two receivers so that the sender sends the data on the unicast connection, and the receivers receive the data on the unicast connection.

Another object of the invention is a device for transmitting data to at least two receivers, in a network where a data between a sender and a receiver is carried on a connection and where a unicast connection enables the sender to send the data and the receiver to acknowledge the reception of the data. The device comprises means for sending data over a unique unicast connection to at least two receivers.

According to an embodiment, the device comprises means for identifying the emitter of an acknowledgment.

According to an embodiment, the device comprises means for reemitting the data either if the acknowledgment has not been received from all the receivers or at least an acknowledgment indicates that a receiver has not correctly received the data.

According to another embodiment, the device comprises means for sending data over a unique unicast connection to receivers of a first group and receivers of a second group, and means for reemitting the data either if the acknowledgment has not been received from all receivers of the first group or at least an acknowledgment indicates that a receiver of the first group has not correctly received the data.

According to an embodiment, the device comprises a traffic controller.

According to an embodiment, the device is a base station according to the IEEE802.16 standard Another object of the invention is a computer program product comprising program code instructions for executing the steps of the process according to the invention, when that program is executed on a computer. By "computer program product", it is meant a computer program support, which may consist not only in a storing space containing the program, such as a diskette or a cassette, but also in a signal, such as an electrical or optical signal.

The invention will be better understood and illustrated by means of the following embodiment and execution examples, in no way restrictive, with reference to the appended figures among which.

The exemplary embodiment comes within the framework of a transmission on a wireless local area network according to the IEEE802.16 standard, but the invention is not limited to this particular environment and may be applied within other standards where a device sends multicast traffic to other devices. More information concerning IEEE802.16 standard can be found in the IEEE P802.16-2004_COR1 (D5) Draft IEEE Standard for Local and metropolitan area networks Corrigendum to IEEE Standard for Local and Metropolitan Area Networks-Part 16: Air Interface for Fixed Broadband Wireless Access Systems, and also in subsequent versions.

In FIG. 1 to FIG. 4, the represented blocks are purely functional entities, which do not necessarily correspond to physical separated entities. Namely, they could be developed in the form of software, or be implemented in one or several integrated circuits.

Figure 1:
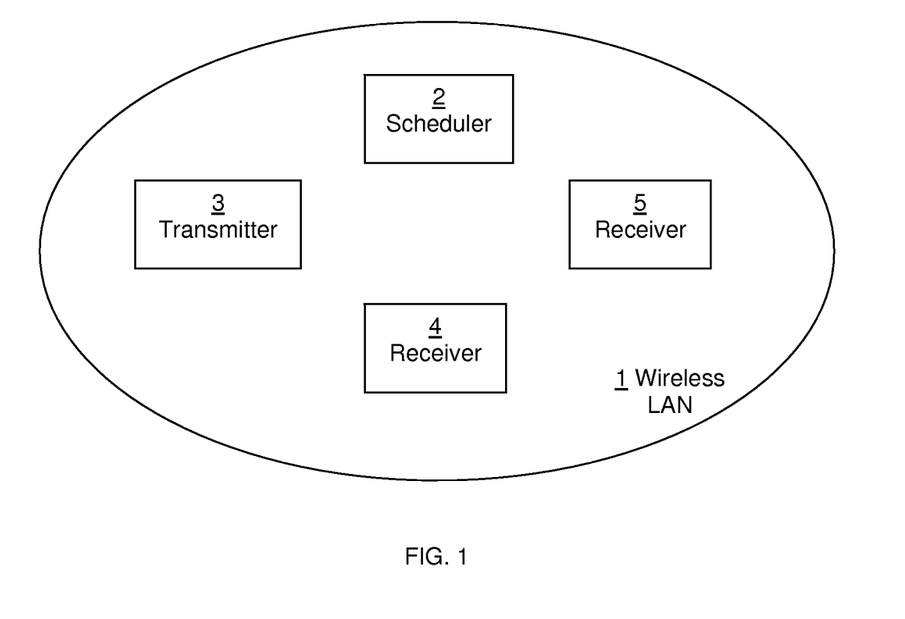
FIG. 1 is a block diagram of the functional modules of the embodiment.

In FIG. 1 are represented the different functional modules of the wireless local area network 1. The transmitter 3 is the sender of the data. The receivers 4, 5 receive the data. The scheduler 2, also called a traffic controller, controls the allocation of wireless resources; it assigns the connections required for the transmission between a transmitter and a receiver.

Figure 2:
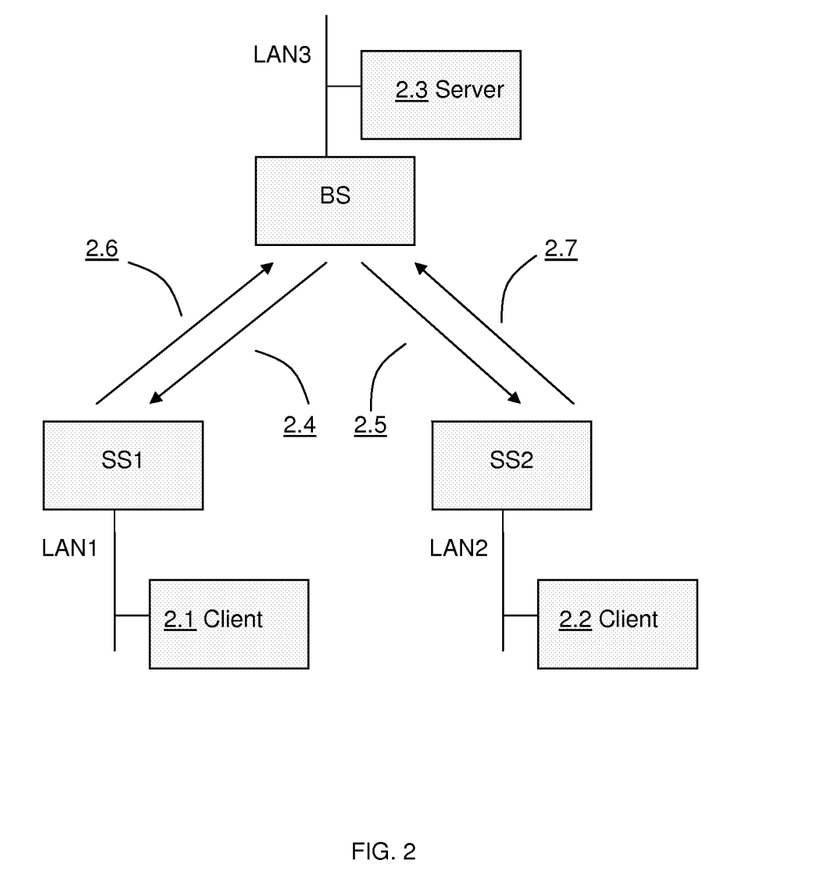
FIG. 2 represents the wireless network of the embodiment.

FIG. 2 is a wireless network according to the embodiment. It comprises a base station BS, two subscriber stations SS1 and SS2. The BS is connected to a local area network LAN3 that comprises a server 2.3. The SS1 and SS2 are respectively connected to a local area network, LAN1 and LAN2, that each comprises at least a client, 2.1 and 2.2. Of course the wireless network may comprise other subscriber stations which are not shown in the figure.

The FIG. 2 also represents the connections between the BS and the SS's:

A connection from the BS to the SS1: 2.4
A connection from the BS to the SS2: 2.5
A connection from the SS1 to the BS: 2.6
A connection from the SS2 to the BS: 2.7

According to the IEEE802.16 standard, a connection may be characterized by the following parameters:

Downlink, from the BS to the SS; Uplink, from the SS to the BS,
Modulation type (BPSK, QPSK, 16QAM, 64QAM),
Classifier to identify the packets to put in the connection itself,
Unicast or Multicast,
Fragmentation allowed or forbidden,
Automatic Repeat Request enabled or disabled, with the following parameters: window size, time out and block size.
Data rate,
Quality of service: Best Effort, real time Polling Service, non real time Polling Service, Unsolicited Service Grant.

According to the embodiment, the multicast traffic is sent from the BS to the SS1 and the SS2 on a same unicast connection, represented in the FIG. 2 as 2.4 and 2.5 with the same connection identifier. A unicast connection is open between each SS and the BS, represented as 2.6 and 2.7, to transport the acknowledgment packets.

Figure 3:
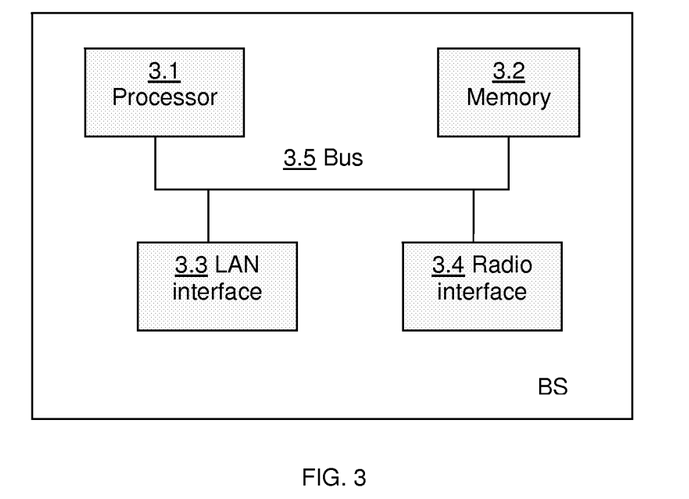
FIG. 3 is a block diagram of the base station according to the present embodiment.

The FIG. 3 represents the building blocks of the BS. The BS comprises a processor 3.1, a memory 3.2, a LAN interface 3.3 and a radio interface 3.4, which are interconnected by a bus 3.5. The processor comprises the means for reemitting the data, which comprises the means for identifying the emitter of an acknowledgment. The processor also comprises the scheduling means.

Figure 4:
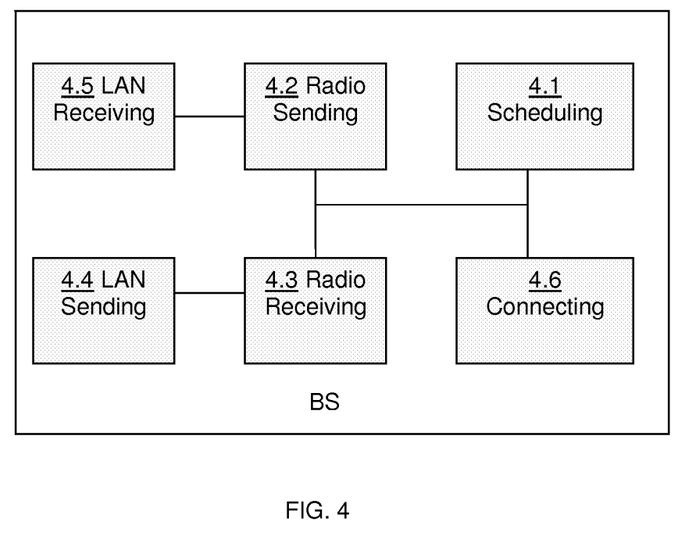
FIG. 4 represents the functional modules of the base station.

The FIG. 4 represents the functions of the BS. The BS comprises scheduling means 4.1, radio sending means 4.2 and receiving means 4.3, LAN sending means 4.4 and receiving means 4.5. The radio sending means permit to send data to a receiver, or to several receivers on a unique unicast connection. The radio receiving means permit to receive data and acknowledgment from the receivers. The scheduling means intend to allocate the wireless resources on the wireless LAN between the stations. The BS also comprises connecting means 4.6 for performing the control functions of connecting the BS to a SS. The radio sending means comprise two timers, the ack_timer and the time_of_life as defined below.

Figure 5:
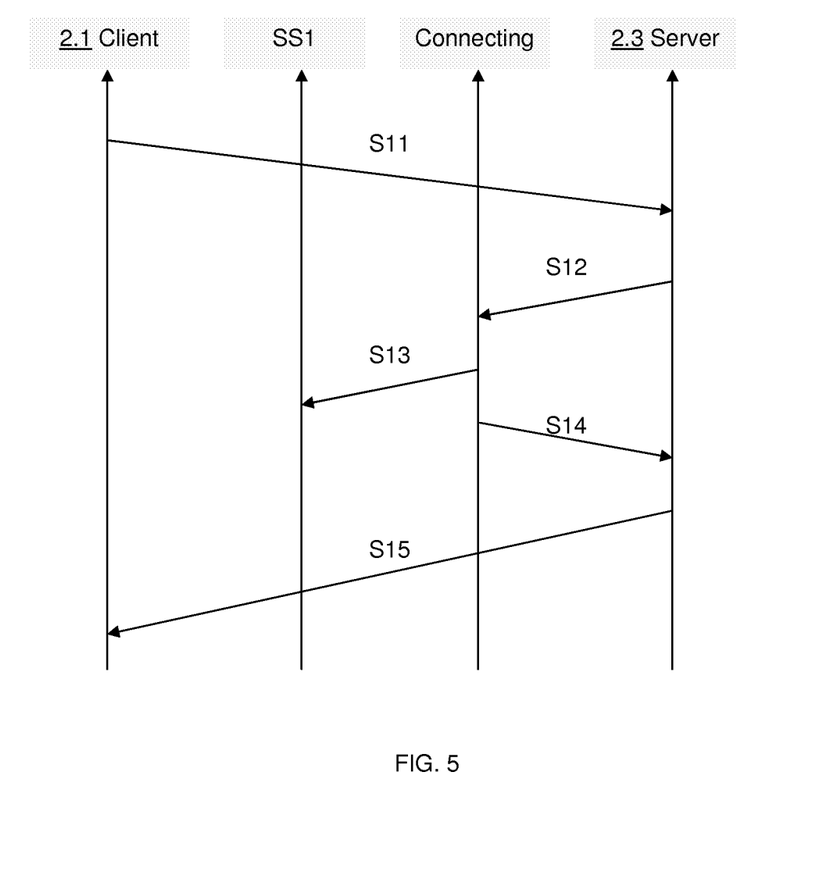
FIG. 5 is a flow chart representing the opening of a connection.

The FIG. 5 is a flow chart representing the opening of a connection. The client 2.1 sends a request S11 to the server 2.3 to receive a stream from the server 2.3. According to the embodiment, the request is an HTTP request, and the HTTP server is located in the base station BS. In another embodiment, the HTTP server could be comprised in another device located on the LAN3. The stream is a multicast traffic, in the form of an audio or a video data. At the reception of the request, the server sends a request S12 to the connecting means in order to open a connection between the BS and the SS; the connecting means comprise among other scheduling means for managing the connections on the wireless medium. The BS and the SS carry out the opening of the connection S13, as described in the IEEE802.16 standard. The BS creates a new connection with at least the following parameters: downlink, ARQ-enabled, unicast, and a connection identifier noted CID1. When the connection has been open, the server 2.3, which has been informed by the connecting means S14, sends a HTTP response S15 to the client 2.1.

When another SS, SS2, is interested by the reception of the same streaming, it sends a request to the BS to open a connection in order to receive the streaming. The same steps as indicated in the FIG. 5 apply. The difference with the opening of the connection for the SS1 is that the BS identifies that the request is for a streaming that is already mapped to a unicast connection, identified by the connection identifier CID1. Then, the BS creates a connection with the requesting SS; it uses the CID1 as the one used for the connection to the first SS and the same connection parameters. The BS does not create a new classifier as indicated in the IEEE802.16 standard, because the connection and its classifier have already been created. The multicast traffic is then sent on a same unicast connection towards two receivers. Of course more than two receivers could register to the same unicast connection to receive the same stream. Nevertheless, the number of SS should be low, in order to limit the amount of data to be retransmitted by the sender.

The BS as described in the embodiment is interoperable with any subscriber station compliant with the standard. The SS does not require any specific implementation to interact with the BS of the embodiment. The SS recognizes a unicast connection as indicated in the IEEE802.16 standard.

Figure 6:
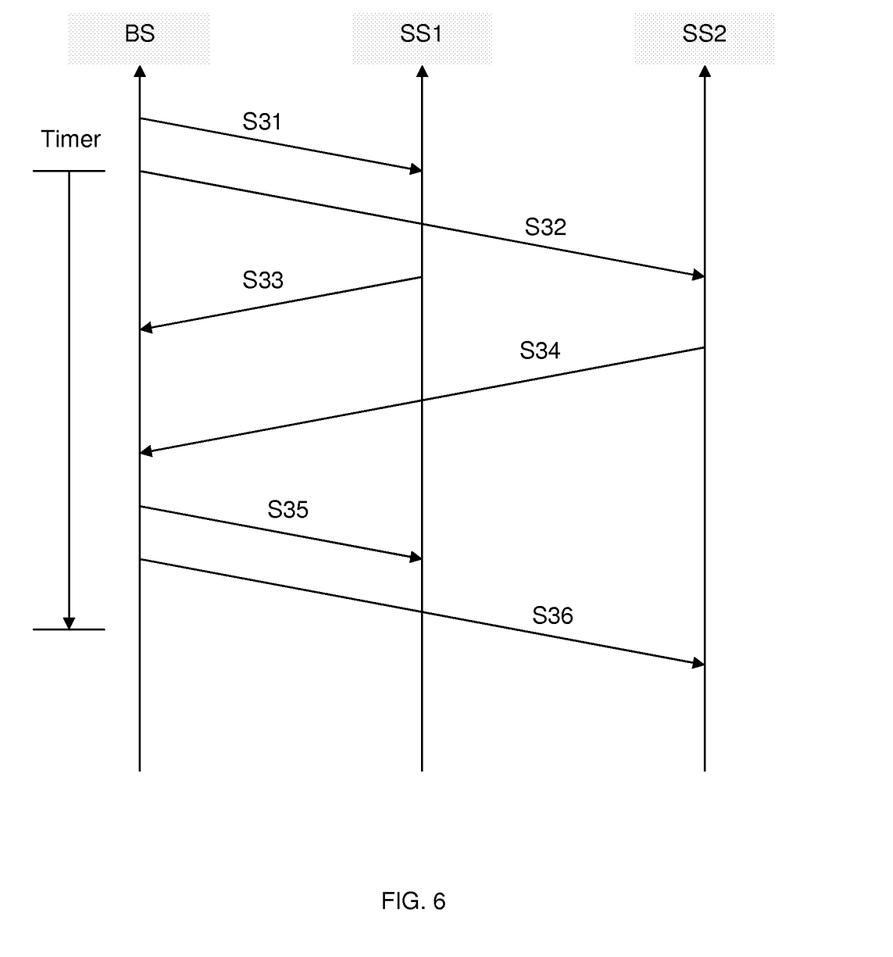
FIG. 6 is a flow chart representing the data transfer according to the present embodiment.

The FIG. 6 is a flow chart representing the data transfer between the BS and the SS's. The BS sends a data packet on the unicast connection. The data packet is received respectively by the SS1, S31, and the SS2, S32. SS1 acknowledges the correct reception of the data packet; it sends a positive acknowledgment packet, noted ACK packet S33, indicating that the data packet has been correctly received. SS2 acknowledges the wrong reception of the data packet; it sends a negative ACK packet S34, indicating that the data packet has not been correctly received. The BS therefore reemits the data packet on the unicast connection, S35 and S36.

According to the embodiment, the sender of the data packet, the BS in the embodiment, uses a proprietary mode allowing the management of this "unicast multicasted" connection using the ARQ.

According to the IEEE802.16 standard, in an ack-enabled connection, after having sent a data packet, the transmitter waits for the ACK packets from the receiver. The ACK may be positive or negative. If negative, the packet may be reemitted up to a maximum number of time, and during the limit of a time frame.

In the embodiment, the transmitter sends a packet in an ack-enabled connection to several receivers. Instead of waiting an ACK from a single receiver, it waits for the ACK from all the receivers as indicated in the FIG. 7.

The transmitter comprises two timers. The first timer is the time_of_life, which corresponds to the time of life of the packet. The packet is kept in the memory of the transmitter up to the end of the time of life; it is then discarded from the memory. The second timer is the ack_timer. It corresponds to the time the transmitter waits after the transmission of a packet before reemitting the packet in case it has not received all the positive ACK packets. The ack_timer is called the Retry_Timeout in the IEEE802.16 standard. The transmitter may reemit the data packet up to a maximum number of times.

Figure 7:
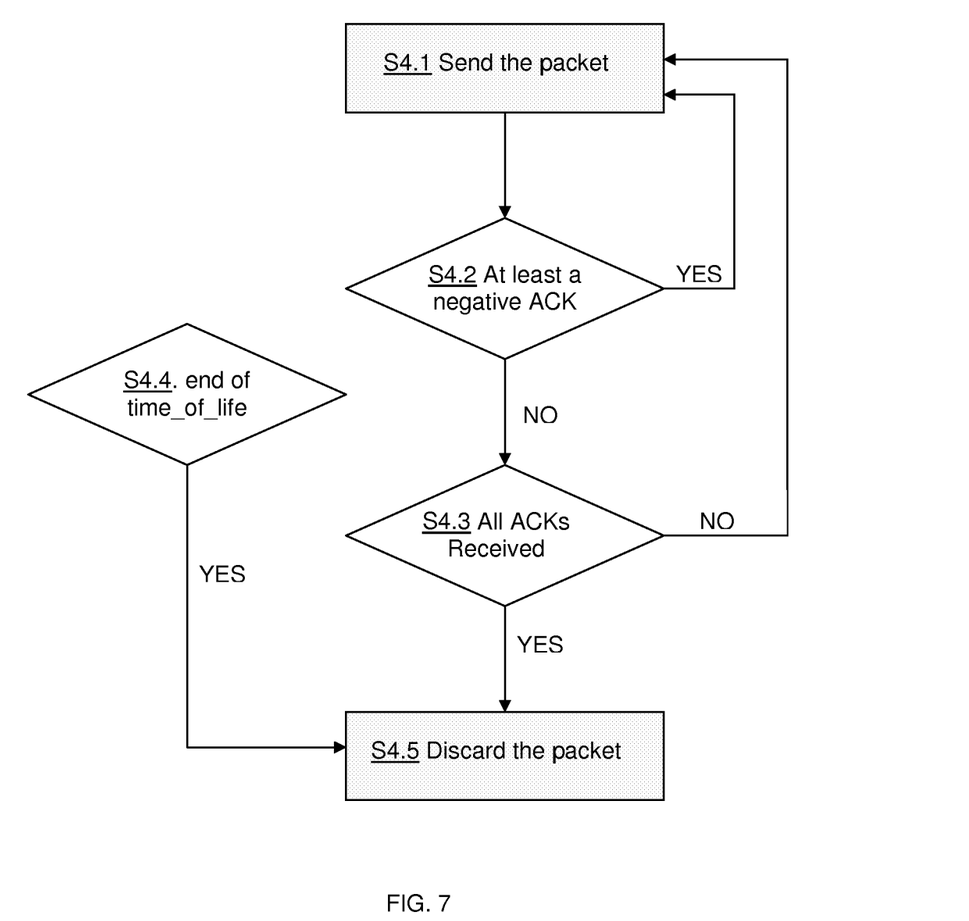
FIG. 7 illustrates the steps of the acknowledgment rule according to the embodiment.

The rule for the packet acknowledgment is described in the FIG. 7. It is implemented in the BS, and can be illustrated according to the following steps:

S4.1. The transmitter sends a data packet.

S4.2. As soon as at least one SS has negatively acknowledged it, a packet is considered as not being correctly received. And it is retransmitted up to the maximum number of time.

S4.3. If before the end of the ack_timer, the BS has received all the ACK packets, and if all the SS have positively acknowledged it, the packet is considered as being correctly received by all the SS. Then the BS discards the packet from its memory, S4.5. At the end of the ack_timer, if all the ACK packets have not been received the BS reemits the packet.

S4.4. At the end of the time_of_life of the packet, the packet is discarded, S4.5, as indicated in the IEEE802.16 standard.

As indicated above the BS shall be able to receive an ACK packet from all the SS's. This means that, according to the embodiment, the BS is able to detect the emitter of the ACK packet.

In the IEEE802.16 standard, two basic connections, an uplink connection and a downlink connection, are systematically created for transporting the management packets between the BS and the SS. They are called the basic connections. According to the embodiment, when a SS wants to send an ACK to the BS, it creates a MAC PDU and sends it on the uplink connection with this basic CID number assigned. So that, even if all the ACK packets have the same aspects, they are differentiated by the basic CID associated to the SS.

In another embodiment, the ACK can be piggybacked with a payload packet that below to another connection; in that case the CID is not the basic CID but another CID used by this SS. Therefore the SS can be identified with the CID used.

In another embodiment, each SS transmits its packet in an uplink burst allocated in the frame by the BS. So that, when receiving a burst, the BS knows which SS is sending the burst, and then which is the SS sending the ACK contained in this burst. In more details, the MAC PDU's are sent in a burst. A burst is characterized by its transmission mode (which is the OFDM modulation), its duration, and its location in the frame. The frame comprises the frame header, the downlink bursts, the contention access periods, and the uplink bursts. The frame header contains the description of all the bursts, including the modulation used, the duration, the location in the frame, the SS which has to generate the uplink burst and the destination (CID values) of all the downlink bursts. In this embodiment, the streaming is sent by the BS to several SS through a downlink burst. And the ACK are received from all the concerned SS through the respective uplink bursts.

The acknowledgment management rule may be applied to a subset of SS only that are registered to the unicast connection. Several SS's receive the same stream on the same unicast connection. They all use the acknowledgment mechanism. But the sender of the packet takes into account the ACK packet coming from a subset of the receivers only. The sender sends data to receivers of a first group and receivers of a second group; it reemits the data if the acknowledgment has not been received from all receivers of the first group or at least an acknowledgment indicates that a receiver of the first group has not correctly received the data.

The first group and the second groups may be pre-configured; some receivers have a privilege role among the others; and it is important that these receivers correctly receive the stream. The selection may be done as follows:

Based on the type of device; for example the plasma screen is expected to receive the stream better than a laptop.

Based on a selection of the device by a user; on a user interface of the emitter or the receiver, the user may set devices in the first or the second list. The ones in the first list are taken into account for the acknowledgment management rule, and the ones in the second list are not taken into account.

This may be automatically configured; a receiver has a very bad reception quality and continuously sends some ACK packets indicating a bad reception. Instead of reemitting many data packets because of this receiver, the sender put the receiver on a state where its ACK packets are not taken into account for the reemission. If the receiver has a better quality reception, it can then be put in a state where its ACK packets are taken into account. This prevents a device from disturbing all the other devices by slowing the transmissions due to the repetition mechanism.

Another selection of the receivers may be done as follows: the number of devices of the first group is limited to a maximum. The first devices that request the reception are part of the first group. When the maximum has been reached, the new devices are part of the second group. When a device of the first group resumes the reception, a device from the second group may be then moved to the first group.

The invention claimed is:

1. Method for transmitting data between a wireless transmitter device, and at least two wireless receiver devices, in a wireless network, said method comprising at the wireless transmitter:

opening a unicast MAC connection identified with a connection identifier, between said wireless transmitter and a first wireless receiver, where a unicast MAC connection enables a wireless transmitter to send packets in a MAC format and a wireless receiver to acknowledge a reception of packets in a MAC format according to an automatic repetition mechanism, each MAC header of packets in a MAC format comprising said connection identifier in the CID field;

opening a unicast MAC connection having said connection identifier between said wireless transmitter and at least a second wireless receiver;

sending said packets in a MAC format on each of said unicast MAC connections with said same connection identifier to said wireless receivers; and receiving acknowledgment packets according to said automatic repetition mechanism from said at least two wireless receivers, said acknowledgment packets indicating the correct reception of said packets in a MAC format.

2. Method according to claim 1 wherein it comprises the step of identifying the emitters of said acknowledgment packets.

3. Method according to claim 1 wherein it comprises the step of reemitting said packets in a MAC format by said wireless transmitter either if the acknowledgment packet indicating the correct reception of the packet in a MAC format has not been received from all the wireless receivers or at least an acknowledgment packet indicates that a wireless receiver has not correctly received said packet in a MAC format.

4. Method according to claim 1 wherein it comprises the steps of:

sending packets in a MC format over a single unicast MAC connection to at least two wireless receivers of a first group and at least two wireless receivers of a second group; and reemitting said packets in a MAC format either if an acknowledgment packet has not been received from all wireless receivers of the first group or at least an acknowledgment packet indicates that a wireless receiver of the first group has not correctly received said data.

5. Method according to claim 1, wherein the wireless network conforms to the IEEE802.16 standard.

6. Method according to claim 5, comprising the step of indicating an uplink burst to said wireless receiver, each uplink burst being specific to each one of the wireless receivers and enabling each wireless receiver to send acknowledgment packets and the wireless transmitter to identify the emitter of the acknowledgment packet.

7. Method according to claim 5, wherein the step of identifying the emitters of said acknowledgment packets comprises the step of indicating an uplink MAC connection to said emitter, said uplink MAC connection being used to transport said acknowledgement packets, each uplink MAC connection being specific to each one of the wireless receivers and enabling each wireless receiver to send acknowledgment packets and the wireless transmitter to identify the emitter of the acknowledgment packet.

8. A device for transmitting data to at least two wireless receiver devices, in a wireless network, said device for transmitting comprising:

a radio interface and a processor configured to:

open a unicast MAC connection identified with a connection identifier, between said device for transmitting and a first wireless receiver, where a unicast MAC connection enables the sending of packets in a MAC format by said device for transmitting, and the sending of an acknowledgement of a reception of packets in a MAC format according to an automatic repetition mechanism by said first wireless receiver, each MAC header of packets in a MAC format comprising said connection identifier in the CID field;

open a unicast MAC connection having said connection identifier between said device for transmitting and at least a second wireless receiver;

send said packets in a MAC format on each of said unicast MAC connections with said same connection identifier to said wireless receivers; and receive acknowledgment packets according to said automatic repetition mechanism from said at least two wireless receivers, said acknowledgment packets indicating the correct reception of said packets in a MAC format.

9. The device according to claim 8, wherein the radio interface and the processor are further configured to reemit said packets in a MAC format either if the acknowledgment packet indicating the correct reception of the data packet has not been received from all the wireless receivers or at least an acknowledgment indicates that a wireless receiver has not correctly received said packets in a MAC format.

10. The device according to claim 8, wherein the radio interface and the processor are further configured to send packets in a MAC format over a single unicast connection to at least two wireless receivers of a first group and wireless receivers of a second group, and to reemit said packets in a MAC format either if an acknowledgment packet indicating the correct reception of the data packet has not been received from all wireless receivers of the first group or at least an acknowledgment indicates that a wireless receiver of the first group has not correctly received said packets in a MAC format.

11. The device according to claim 8, wherein it comprises a traffic controller.

12. The device according to claim 8, comprising a base station according to the IEEE802.16 standard.

* * * * *